United States Patent [19]

Sherman

[11] Patent Number: 4,786,873
[45] Date of Patent: Nov. 22, 1988

[54] METHOD FOR EVALUATING WATER SATURATION IN PETROLEUM RESERVOIRS FROM DIELECTRIC PERMITTIVITY

[75] Inventor: Michael M. Sherman, Broken Arrow, Okla.

[73] Assignee: Amoco Corporation, Chicago, Ill.

[21] Appl. No.: 871,730

[22] Filed: Jun. 6, 1986

[51] Int. Cl.$^4$ .......................... G01V 3/38; G01V 3/18
[52] U.S. Cl. ...................................... 324/323; 73/152; 324/341; 324/376
[58] Field of Search ............... 324/323, 333, 338, 341, 324/376; 364/422; 73/151, 152, 153

[56] References Cited

U.S. PATENT DOCUMENTS

| | | |
|---|---|---|
| 4,009,434 | 2/1977 | McKinlay et al. |
| 4,015,195 | 3/1977 | Hoyer et al. |
| 4,281,289 | 7/1981 | Donaldson et al. ............ 324/376 X |
| 4,486,714 | 12/1984 | Davis et al. ......................... 324/376 |
| 4,494,071 | 1/1985 | Fertl .................................... 324/338 |
| 4,631,677 | 12/1986 | Park et al. ....................... 324/376 X |
| 4,644,283 | 2/1987 | Vinegar et al. ..................... 324/376 |
| 4,652,828 | 3/1987 | Kenyon et al. ................. 324/341 X |
| 4,703,277 | 10/1987 | Kenyon et al. ................. 324/338 X |

FOREIGN PATENT DOCUMENTS 282113 10/1966 Australia ............................. 324/133

OTHER PUBLICATIONS

Feng et al; "Geometrical Model of Conductive and Dielectric Properties of Partially Saturated Rocks" J. Appl. Phys., vol. 58, No .8, Oct. 15, 1985, pp. 3236-3243.

Sherman, Michael M., "The Calculation of Porosity from Dielectric Constant Measurements . . . " The Log Analyst, Jan.-Feb. 1986, pp. 15-24.

Meador et al; "Dielectric Constant Logging, A . . . Estimation of Formation Water Volume" Paper No. SPE 5504 presented at Fall Meeting of SPE, 1975, pp. 1-8, FIGS. 1-8.

Wharton et al; "Advancements in Electromagnetic Propagation Logging" SPE Paper No. 9041 presented at SPE Rocky Mt. Reg. Meeting May 14-16, 1980, pp. 1-6, FIGS. 1-10.

Sen et al; "A Self-Similar Model for Sedimentary Rocks . . . of Fused glass Beads" Geophysics, vol. 46, No. 5 (May 1981); pp. 781-795.

Bussian, A. E.; "Electrical Conductance in a Porous Medium" Geophysics, vol. 48, No. 9 (Sep. 1983); pp. 1258-1268.

Primary Examiner—Gerard R. Strecker
Attorney, Agent, or Firm—L. Wayne White

[57] ABSTRACT

A new functional parameter reprsentative of the geometrical distribution of matrix material and the variable geometrical distribution of hydrocarbon and water in pore spaces in a porous earth formation is determined and is used to evaluate, or to determine, water saturation of the formation from dielectric permittivity measurements.

7 Claims, 2 Drawing Sheets

Comparison of Porosity Index to Water Saturation
for Berea Sandstone Rw=.138 Ohm-m, Freq.=1.1GHz
Dielectric Saturation Exponent k=1.30

Comparison of Porosity Index to Water Saturation
for Berea Sandstone Rw=.138 Ohm–m, Freq.=1.1GHz
Dielectric Saturation Exponent k=1.30

Combination of Water Resistivity and Signal Frequency for Which k=(1−L)n is Applicable

METHOD FOR EVALUATING WATER SATURATION IN PETROLEUM RESERVOIRS FROM DIELECTRIC PERMITTIVITY

FIELD OF THE INVENTION

The invention relates to dielectric logging of porous earth formations. In a particular aspect, the invention relates to an improved method for evaluating and determining water, and oil, saturation of subterranean porous earth formations containing hydrocarbon and water from dielectric permittivity measurements representative of the porous earth formations.

BACKGROUND OF THE INVENTION

An essential prerequisite for a commercial accumulation of hydrocarbons is the existence of a reservoir. For a rock to act as a reservoir, the rock must have two essential properties: it must have pores to contain the oil or gas (porosity); and the pores must be connected to allow the movement of fluids (permeability).

Porosity $\phi$ can be expressed as a volume ratio, which is the ratio of voids (pore space) to solid rock (matrix), or more frequently as a percentage:

$$\text{Porosity (\%)} = \frac{\text{volume of voids}}{\text{total volume of rock}} \times 100$$

The pores can contain connate water, but within a field, contain oil or gas as well. Thus, porous reservoir rocks are a mixture of a solid (rock) and two fluid phases (hydrocarbon and water). The relative percentage of hydrocarbon or water in the pores of a reservoir rock is described as oil or water saturation respectively. In making decisions relative to the production of a field, it is important to know the hydrocarbon content (volume). Generally, the quantitative calculation of the hydrocarbon content of a reservoir is approached by first calculating the water saturation $S_w$. Then oil saturation can be determined for example, as $(1-S_w)$.

Resistivity measurements can be used to calculate water saturation $S_w$ using Archie's Water Saturation Equation:

$$S_w^n = R_o/R_t = \sigma_t/\sigma_o, \tag{1}$$

where n is the Archie Saturation Exponent, $R_o$ is the resistivity of formation rock 100% saturated with water ($\sigma_o$ being the corresponding conductivity), and $R_t$ is the resistivity of noninvaded partially saturated formation rock ($\sigma_t$ being the corresponding conductivity). Resistivity tools have been extensively used and, accordingly, Archie saturation exponents, total porosity, and other values which can be determined from resistivity logging are available or can be readily obtained or determined by those skilled in the art.

Archie saturation exponents can, for example, be determined from core measurements. Typically, cores are saturated with a simulated formation brine and the resistivity measured to determine $R_o$. The saturated cores can then have part of the water removed by any of several known techniques and the resistivity $R_t$ at a partially water saturated condition can be measured. The value of water saturation of the core can be determined gravimetrically and Archie's equation can then be solved for n. This n value can be used to interpret resistivity measurements from downhole logging tools to determine the water saturation of petroleum reservoirs. All this is known to those skilled in the art and need not be further described here.

From Equation (1), it is apparent that the Archie Saturation Exponent n is representative of the influence of both hydrocarbon and water on water saturation since $R_t$ is the resistivity of partially saturated formation rocks, that is, the resistivity of rock containing both hydrocarbon and water.

Resistivity measurements cannot distinguish between formations containing fresh water and oil-bearing formations because fresh water and oil each have high resistivity (low conductivity). Dielectric logging tools were therefore developed for use in formations having fresh water to distinguish between water and hydrocarbons. Typically, dielectric logging tools measure formation dielectric permittivity using frequencies in the range from about 15 megahertz (MHz) to about 1.1 gigahertz (GHz), or more broadly from above 0 to about 1.3 GHz.

Dielectric logging tools can also be used to determine water saturation in formations of interest. Dielectric logs are able to distinguish between water and oil because the dielectric constant of water is between about 50–80 while for oil it is about 2. The rock matrix in which the oil and water are held has a dielectric constant between about 4–9. Thus, the large contrast in dielectric constant between water and oil and rock can be used to detect the presence of water in the rock pore spaces.

Increasingly, dielectric logging tools have been used in formations that contain, not fresh, but saline water (brine). Thus, for example, dielectric logging has been used to evaluate formations which have been subjected to waterflood because the waterflood can make it extremely difficult or impossible to obtain accurate data by use of resistivity logging tools. This is because the factor $R_t$ in the Archie Water Saturation Equation (1) above requires a determination of the resistivity of a noninvaded zone, that is, a region of the formation which has not been altered by invasion of nonformation fluids, and measurement of $R_t$ (resistivity of the noninvaded zone) by resistivity logging tools in formations which have been subjected to waterflooding is often just not feasible. Further, in many instances, water saturation $S_w$ is not directly determined from Equation (1) above, but by Equation (1a):

$$S_w^n = \frac{1}{\phi^m} \cdot R_w/R_t, \tag{1a}$$

where $\phi$ is the porosity of the formation, m is the cementation exponent, $R_w$ is the resistivity of water present in the formation, and the remaining terms are as defined above. In formations which have been subjected to waterflooding, the value of $R_w$ as determined by resistivity measurements is frequently not reliable; hence dielectric logging, which is less sensitive to $R_w$, is preferred.

Accordingly, in recent years it has become highly desirable to use dielectric logging measurements in formations which have widely varying saline contents, as well as in formations characterized by fresh water. However, the dielectric permittivity of a formation can vary with the frequency of the dielectric logging tool utilized, and also with the salinity of the formation fluids.

Thus, even though the dielectric permittivity of dry rock is essentially independent of frequency across the range of conventional dielectric logging tools, as is water, except for a slight effect above 1 GHz caused by dipole relaxation, when water and rock are combined, there is a frequency dependency in dielectric permittivity across the frequency range of dielectric logging tools.

Further, the dielectric permittivity $\epsilon^*$ of a formation describes the electrical response of the formation materials to an applied electric field and contains a real part $\epsilon'$ (typically measured in farads/meter which describes the separation, or polarization, of electric charge), and an imaginary part $\epsilon''$ which is descriptive of the flow of electric charge, for example, conductivity, resistivity, or the like. As a result, dielectric permittivities are influenced by the salinity of brine saturated rocks. This is because as salinity increases, the real part of the water permittivity decreases while water conductivity and the imaginary part of water dielectric permittivity increases. These changes in the water permittivity change the rock permittivity by increasing the apparent rock conductivity and in many cases, result in an increase in the real part of the rock permittivity. These changes due to salinity can also be frequency dependent.

A number of methods have been developed for determining oil and water saturation from dielectric permittivity data. For purposes of providing background to the invention hereinafter set forth, these methods can be categorized as methods which do not involve determining a measure of water filled porosity from the dielectric permittivity data and those which do involve such a determination. In regard to the latter, water is the dominant influence on the dielectric permittivity in water-filled or partially water-filled rock, even though the dielectric permittivity of the saturated rock is a combination of its constituent parts. Various models can be and are used to describe the constituent contributions to the total dielectric permittivity. Each model describes the volume percent of the constituent and a method for summing the constituents. Often these models can be solved for the individual volume percents of the constituents given the total and constituent values of the dielectric permittivity. Because the permittivity of rock and oil are similar, it can be assumed that only two constituents exist, rock and water, and the percent volumes of each sum to unity.

$$\phi_{rock} + \phi_{water} = 1$$

The percent volume of water is referred to as the water-filled porosity $\phi_c$. The actual value calculated for $\phi_c$ can vary from model to model and represents an apparent water-filled porosity based on the assumptions of the particular model used.

The following deal with methods of determining oil and water saturation from dielectric permittivity data which do not involve determining a measure of water filled porosity from dielectric permittivity data. Each of these methods moreover, is silent on the problem that water filled porosity determined from dielectric permittivity data often deviates significantly from directly measured water-filled porosity, and provides no technique or method for assessing the reliability of water-filled porosity or water saturation determined from dielectric permittivity data, or for causing water-filled porosity or water saturation thus determined to approximate actual or measured water-filled porosity or water saturation.

Fertl, U.S. Pat. No. 4,494,071 (1985) deals with determining water saturation in earth formations independent of lithology by obtaining base log measurements of the dielectric permittivity of the formations, then logging the formations a second time with the zone of investigation substantially 100% water saturated, and combining the base log measurements with the subsequent log measurements to provide a log of the water saturation of the formation which is substantially independent of lithology.

McKinlay, et al., U.S. Pat. No. 4,009,434 (1977) deals with a dielectric induction logging system for obtaining water and residual oil saturation of earth formations. The measured permittivity is then combined with porosity measurements, from another source, according to predetermined relationships and the water saturation determined. Thus, McKinlay, et al. do not determine porosity from dielectric permittivity data of porous reservoir rock, but require porosity known from other sources.

Hoyer, et al., U.S. Pat. No. 4,015,195 (1977) deals with a method of determining hydrocarbon saturation in a shaly formation by measuring dielectric constant at frequencies less than 50 kHz in first and second portions of the formation. Hoyer, et al. reports that the conductivity parameter of the formation is related to the dielectric constant and can be directly determined by correlating the measured dielectric constant with the relation between dielectric constant and the conductivity parameter. The Hoyer, et al. method deals with correcting for the effect of shale on conductivity, and the water saturation calculated from conductivity, by utilizing dielectric constant measurements made at a frequency of less than 50 kHz. The Hoyer, et al. method does not, however, calculate a water-filled porosity from the dielectric constant data.

The following deal with methods of determining oil and water saturation from dielectric permittivity data which do involve determining a measure of water-filled porosity from dielectric permittivity data.

Two methods for determining porosity from dielectric permittivity data, the Time Propagation Method (TPO) and the complex Refractive Index Method (CRI) (Wharton, et al., "Advancements in Electromagnetic Propagation Logging," *SPE Paper* 9041, 1980) are based upon the Lichtenecker-Rother (LR) Equation (Meador, et al., "Dielectric Constant Logging, A Salinity Independent Estimation of Formation Water Volume," *SPE Paper* 5504, 1975). (See also Wharton, et al., "Electromagnetic Propagation Logging: Advances in Technique and Interpretation, SPE Paper 9267.) These methods both assume a fixed geometrical distribution of formation and fluids consisting of layers in series and do not take into account the influence of a variable geometrical distribution of hydrocarbon and water in a porous reservoir rock, that is, the influence of a variable distribution of rock. Further, these methods are silent on the problem that porosity determined from dielectric permittivity data often deviates significantly from measued water-filled porosity, and provide no method or technique for assessing the reliability of porosity determined from dielectric permittivity data or for causing such porosity to approximate to true or measured water-filled porosity.

A third method is based upon the Hanai-Bruggeman Equation (HB) (Bussian, "Electrical Conducts in a Porous Medium," *Geophysics,* v. 48, no. 9, 1983, pp. 1258–1268; Sen, et al., "A Self-Similar Model for Sedimentary Rocks with Application to the Dielectric Constant of Fused Glass Beads," *Geophysics,* v. 46, no. 5, 1981, pp. 781–795) and differs in a fundamental way from the TPO and CRI Equations in that the HB Equation has an adjustable parameter known as the depolarization factor (L) to compensate for the variations in pore geometry that are present in rock formations. The depolarization factor (L) varies between 0 and 1 depending on the geometrical distribution of the constituent materials. The factor (L) can be determined for a particular reservoir by laboratory measurement using core samples, or can be estimated. In the laboratory, the constituent values for dielectric permittivity and water-filled porosity can be determined and the HB Equation can be solved for the geometrical parameter L. By measuring L on a number of samples from a reservoir, a least squares regression on the L valus can be performed, and in many cases an L value representative of the reservoir can be obtained. Unlike the HB method, the TPO and CRI methods do not have an adjustable geometric factor such as (L). Accordingly, use of the HB Equation can increase the accuracy of porosity determination from dielectric permittivity data when core measurements are available to determine the depolarization factor. (See Sherman, "The Calculation of Porosity from Dielectric Constant Measurements: A Study Using Laboratory Data," SPWLA Paper, 1985, published in The Log Analyst, Vol. XXVII, No. 1, Jan.-Feb., 1986.) The factor (L), however, while it compensates for variations in pore geometry present in a rock formation, is determined experimentally from oil-filled or water-filled rocks, and hence does not take into account the influence of the variable geometric distribution of hydrocarbon and water in a porous earth formation. Compare also, Feng and Sen, "Geometrical Model of Conductive and Dielectric Properties of Partially Saturated Rocks," 58 J. APPL. PHYS. 3237–3243 (1985). By utilizing a twophase self-similar model, Feng and Sen simulate the dielectric constant $\epsilon$ of a rock by an equation (see Equation 11 in Feng and Sen) in which the porosity of the rock calculated from dielectric permittivity data is predicted to be the true water-filled porosity of the rock.

Thus, these methods which involve determining porosity from dielectric permittivity measurements, are silent on the problem that porosity determined from dielectric permittivity data often deviates significantly from directly measured water-filled porosity, and provide no technique or method for accessing the reliability of porosity determined from dielectric permittivity data or for causing porosity thus determined to approximate measured water-filled porosity.

SUMMARY OF THE INVENTION

It has now been found that te water-filled porosity of porous earth formations determined from dielectric permittivity data often does not approximate the measured water-filled porosity of the rock. In fact, available information indicates that in the great majority of reseroirs, there is a significant deviation from porosity determined from dielectric permittivity data and measured water-filled porosity of the rock. Where porosity determined from dielectric permittivity data is used for determination of water saturation or oil saturation of the rock, these significant deviations can lead to erroneous interpretations relating to production or nonproduction of the reservoir. The invention provides a method for assessing whether such a significant deviation exists, and further provides a method for adjusting water-filled porosity or water saturation determined from dielectric permittivity data to approximate to measured water-filled porosity, and thus provides an improved method for calculating water and oil saturations from dielectric permittivity based water-filled porosity.

The invention thus provides an index of reliability for the significant economic decisions which are based on water and oil saturation calculations based on dielectric permittivity data. The invention further provides improved water and oil saturation values determined from such dielectric permittivity data for making these decisions, which include most significantly the decision whether or not to complete or produce the reservoir.

The practice of the invention provides reliable water and oil saturation determinations which are less sensitive to the frequency of the logging tool and the salinity of the formation water, whereas the frequency and salinity dependency of prior methods of dielectric permittivity interpretation significantly limited the effectiveness of those methods. Thus, the instant invention provides improved reliability, as well as broader applicability than the methods previously known to be used.

In accordance with the invention, in the evaluation of a hydrocarbon and water-bearing porous earth formation, a first formation parameter representative of water saturation based upon dielectric permittivity data representative of the porous earth formation is evaluated by determining a functional parameter also representative of the porous earth formation for functionally relating the first formation parameter representative of water saturation to a second formation parameter based on a measure of water-filled porosity which takes into account the influence of the geometrical distribution of rock and the variable geometrical distribution of hydrocarbon and water in the porous earth formation on the dielectric permittivity data.

In accordance with further aspects of the invention, each of the first and second formation parameters is a measure of water-filled porosity, and the functional parameter functionally relates the value of water-filled porosity determined from dielectric permittivity data to a corresponding value of water-filled porosity of the porous earth formation which takes into account the influence of the geometrical distribution of rock and the variable geometrical distribution of water and hydrocarbon in the porous earth formation on the dielectric permittivity data. Alternatively, each of the first and second formation parameters can be a measure of water saturation and the functional parameter then functionally relates a measure of water saturation determined using dielectric permittivity data of the formation to a value of water saturation of the porous earth formation which takes into account the influence of the geometrical distribution of rock and the variable geometrical distribution of water and hydrocarbons in the porous earth formation on the dielectric permittivity data.

In accordance with further aspects of the invention, the functional parameter can be determined by determining water-filled porosity using dielectric permittivity data for a series of two or more samples of the porous earth formation having different water saturation values, measuring water-filled porosity for each sample of the series, and determining a functional parameter for functionally relating the resulting series of measurements of measured water-filled porosity.

In accordance with a further aspect, the functional parameter can be determined by determining water saturation using dielectric permittivity data for a series of two or more samples of the porous earth formation having different water saturation values, measuring water saturation for each sample of the series, and determining a functional parameter for functionally relating the resulting series of dielectric permittivity based water saturation values to the resulting series of measured water saturation values.

In accordance with a further aspect, the invention comprises determining a value of water saturation based on dielectric permittivity data representative of the porous earth formation and determining the functional parameter by combining the Archie saturation exponent of the Archie saturation equation with the depolarization factor L of the Hanai-Bruggeman equation, each of the Archie saturation exponent and the depolarization factor being representative of the porous earth formation.

In accordance with a further aspect, the functional parameter is representative of the influence on dielectric permittivity of the porous earth formation of the geometrical distribution of matrix materials, and the geometrical distribution of hydrocarbon and water across a range of two or more water saturation values of the porous earth formation.

According to further aspects of the invention, the invention comprises determining a value of water saturation for the porous earth formation based upon dielectric permittivity data of the porous earth formation, determining the functional parameter, and combining the value of water saturation and the functional parameter, and producing a new value of water saturation for the porous earth formation.

In accordance with yet another aspect of the invention, the invention comprises determining for a porous earth formation, whether conductivity is the dominant response of dielectric permittivity of the porous earth formation at a frequency of dielectric permittivity logging, and, where conductivity is the dominant response at the frequency of dielectric conductivity logging, estimating the functional parameter using the Archie saturation exponent and the depolarization factor L as discussed herein.

In accordance with further aspects of the invention, the oil saturation of the porous earth formation is determined using the new value of water saturation determined in accordance with the invention.

The invention will be further understood and appreciated and other applications and uses will be understood from the following detailed description and the drawings in which:

FIG. 1 shows the dielectric permittivity-water saturation exponent k determined for six sandstone samples measured at 1.1 GHz; and FIG. 2 shows a water resistivity-signal frequency domain in which water conductivity is the dominant response in the dielectric permittivity response of a formation.

DETAILED DESCRIPTION OF THE INVENTION

Figure 1:
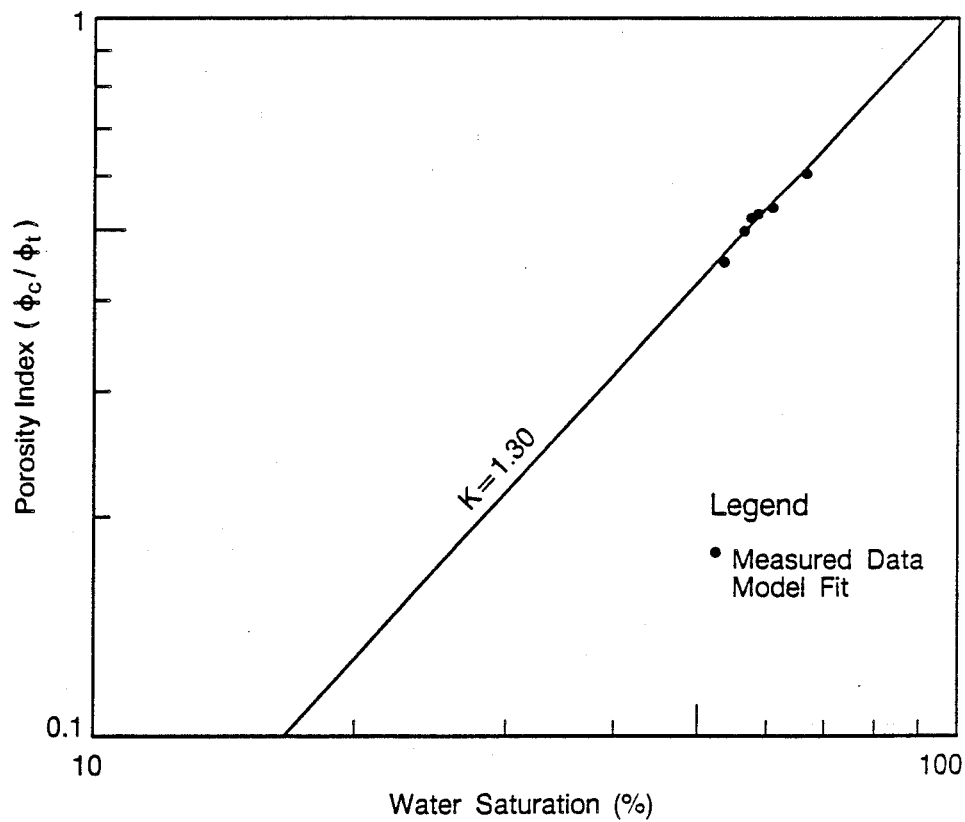

In accordance with the invention, a new parameter representative of the influence on dielectric permittivity of the geometrical distribution of the rock matrix and of the variable geometrical distribution of hydrocarbon and water across a range of two or more water saturation values of a porous subsurface formation can be determined and used for evaluating the reliability of or for determining a formation parameter representative of water saturation of the porous earth formation from dielectric permittivity data representative of the porous earth formation which more closely approximates the measured water saturation of the porous earth formation. It has also been found that this new parameter varies significantly from formation to formation and therefore must be determined independently for each formation. The water saturation values determined using the new parameter can be used in determining exploitation of the petroleum reservoir characterized by the porous earth formation.

There are at present, as discussed above, a number of methods for determining water-filled porosity, $\phi_c$, from dielectric permittivity data representative of a subsurface formation, including the TPO, CRI, and HB methods. Prior to the discovery on which the invention is predicated, it was generally believed or assumed by experts in the field that water saturation, $S_w$, could be related to the porosity, $\phi_c$, determined from dielectric permittivity data by the equation:

$$S_w = \phi_c / \phi_T \qquad (2)$$

where $S_w$ and $\phi_c$ are as described and $\phi_T$ is the total porosity of the porous earth formation.

In regard to $\phi_T$, the measurement of $\phi_T$ can be accomplished using other logging measurements such as those provided by a density or neutron log. It is possible to use the dielectric permittivity to measure total porosity, but to do so part of the reservoir next to the borehole must be 100% water-saturated. The availability of a 100% water zone is somewhat rare, so for most cases, the total porosity can best be determined from logs other than dielectric logs, such as, for example, density or neutron logs. Such methods of determining $\phi_T$ are well known to those skilled in the art and need not be further described here.

Previous efforts in this area would predict that the water saturation is equal to the thus determined porosity ratio shown in Equation (2). Thus, the previous methods recognize that the porosity ratio would vary as a function of water saturation, but did not recognize or predict that the porosity ratio would also vary as a function of the geometrical distribution of the water and hydrocarbon across a series of two or more water saturation values.

As indicated, the previous methods for determining $\phi_c$ from dielectric permittivity data fail to account for the geometrical distribution of the rock matrix and the variable geometrical distribution of hydrocarbon and water in the porous earth formation. Certain methods have been proposed to take into account the geometric influence on the dielectric permittivity of the rock matrix and a single or undifferentiated fluid. These methods assume the presence of only two formation constituents, rock and fluid, and model the formation as a series of arrangements of these constituents. (See Sen, et al., 46 Geophysics 781–795 (1981); Kenyon, et al., *SPE Paper* 13192 (1984)). Another such method is the HB model (Hanai 171 Kolloid-zeitschmidt 22–31 (1960); Sen, et al., supra; Bussian, 48 Geophysics 1258–1268 (1983)).

$$\phi_c = \left(\frac{\epsilon^* - \epsilon_m}{\epsilon^*_w - \epsilon_m}\right)\left(\frac{\epsilon^*_w}{\epsilon^*}\right)^L \quad (3)$$

where $\phi_{c*}$ = the porosity determined from dielectric permittivity $\epsilon^*$ of a formation, where $\epsilon^* = \epsilon'' + i\epsilon''$, thus including a real part $\epsilon'$ and an imaginary part $\epsilon''$ which is descriptive of the flow of electric charge, for example, conductivity, resistivity, or the like in the formations, $\epsilon_m$ is the dielectric permittivity of the rock matrix, $\epsilon_w$ is the dielectric permittivity of water, and L is the depolarization factor for the Hanai-Bruggeman Equation. As indicated, the exponent L in (3) is the depolarization factor and varies between 0 and 1 depending on the geometrical distribution of the rock matrix and the fluid in the porous earth formation. This method to some degree, takes into account geometrical distribution; however, it fails to take into account the variable geometrical distribution of hydrocarbon and water in the porous earth formation across a series of two or more water saturation values since the depolarization factor L is determined from oil-filled or water-filled porous earth formation samples.

It has been found that the measured dielectric permittivity of a porous earth formation depends upon the geometrical distribution of the constituent materials, so that as the water saturation changes so should the geometrical influence of the hydrocarbon and water on the dielectric permittivity. It has further been found that this geometrical influence varies significantly from formation to formation. Therefore, accurate predictions of water saturation from dielectric permittivity data must take into account the changing geometry of the pore fluids as water saturation changes in the particular formation being evaluated. It has been found that Equation (2) can be modified to compensate for the changing geometry of pore fluids with changes in water saturation by the use of a parameter 1/k determined for each formation as in Equation (4):

$$S_w = [\phi_c/\phi_T]^{1/k} \quad (4)$$

The parameter k is representative of geometrical distribution of the rock matrix and of the variable geometrical distribution of hydrocarbon and water on dielectric permittivity as water saturation changes and also functionally relates a value representative of water saturation (for example, a porosity index $\phi_c/\phi_T$) based upon dielectric permittivity to measured water saturation.

The parameter k can be determined by laboratory measurements on core samples. By measuring the dielectric permittivity of a partially water saturated core sample, the water-filled porosity $\phi_c$ can be calculated, for example, preferably from the HB Equation. The total porosity $\phi_T$ can then be determined, for example, by a direct measurement using helium porosimetry as is well known to those skilled in the art. The water saturation level of the sample can, for example, be determined gravimetrically and then Equation (4) is solved for the parameter k. By using two or more samples having different water saturation values, this technique can be used to determine the k value for a reservoir, for example, by a least squares regression on the ratio of $\phi_c/\phi_T$ using Equation (4). Once a value of k has been obtained, the water saturation of a reservoir can be determined by calculating the apparent water-filled porosity $\phi_c$, for example, preferably from the HB Equation, and measuring the total porosity using other porosity measuring logs, such as density or neutron logs, by techniques known to those skilled in the art, and then calculating the water saturation from Equation (4).

Equation (4) can also be written as $$S_w = \frac{(\phi_c)^{1/k'}}{\phi_T}$$

in which the parameter k' is representative of the geometrical distribution of the rock matrix and of the variable geometrical distribution of hydrocarbon and water on dielectric permittivity and also functionally relates a value of water filled porosity $\phi_c$ based upon dielectric permittivity data to measured water filled porosity $\phi_w$.

The new parameter k' can be determined by laboratory measurements by determining $\phi_c$ according to a model of dielectric permittivity interpretation for a series of two or more partially saturated samples of the porous earth formations having different water saturation values, and also determining the value $\phi_w$ (measured water-filled porosity) for each of the series of samples. The resulting series of water-filled porosity values determined using dielectric permittivity data can then be fitted to the values of measured water-filled porosity, for example, by least squares regression, to provide an estimate of parameter k'.

As indicated, the method of the invention can utilize either a determination of k or of k' as herein defined. Preferably, the method utilizes a determination of k since it has been found that this exponent can be functionally related to Archie's Water Saturation Exponent, thus providing a broader applicability for the method by in many cases eliminating the need to directly measure the k parameter.

Thus, the parameter k can be estimated from Archie's Water Saturation Exponent when the water conductivity is a dominant response of the dielectric permittivity response of the porous earth formation. The water conductivity is the dominant response of the water permittivity whenever the imaginary part of the water dielectric permittivity is greater than the real part. The imaginary part of the water permittivity can be determined by dividing the water conductivity by the angular frequency $\omega$ ($2\pi$ times the signal frequency f) of the dielectric permittivity logging tool used in measuring formation dielectric permittivity:

$$a''_w = \sigma_w/\omega > \epsilon'_w$$

As known to those skilled in the art, the real part of the dielectric permittivity can be readily determined, for example, from known published data or by laboratory determination. When the water conductivity is the dominant response, then Eq. (1) becomes $$S_w = [\sigma_T/\sigma_0]^{(1-L)/k} \quad (5)$$

which is Archie's water saturation equation with $$k/(1-L) = n \quad (6)$$

Thus, where water conductivity is the dominant response of the dielectric permittivity data, the functional parameter k can be determined from combining the Archie water saturation exponent n with the depolarization factor L, for example, in accordance with Equation (7) below:

$$k = (1-L)n \quad (7)$$

Equations (5), (6), and (7) represent an approximation since the water conductivity of brine saturated rocks increases with frequency. However, the use of this technique provides a significant improvement in the accuracy of the water saturation values determined from dielectric permittivity data. In this regard, L has been used to determine porosity from dielectric permittivity measurements as in the Hanai-Bruggeman Equation, but has not, so far as known, been previously used to determine water saturation $S_w$ by providing a parameter which modifies the thus determined porosity from dielectric permittivity measurements to cause it to approximate to measured water-filled porosity.

Figure 2:
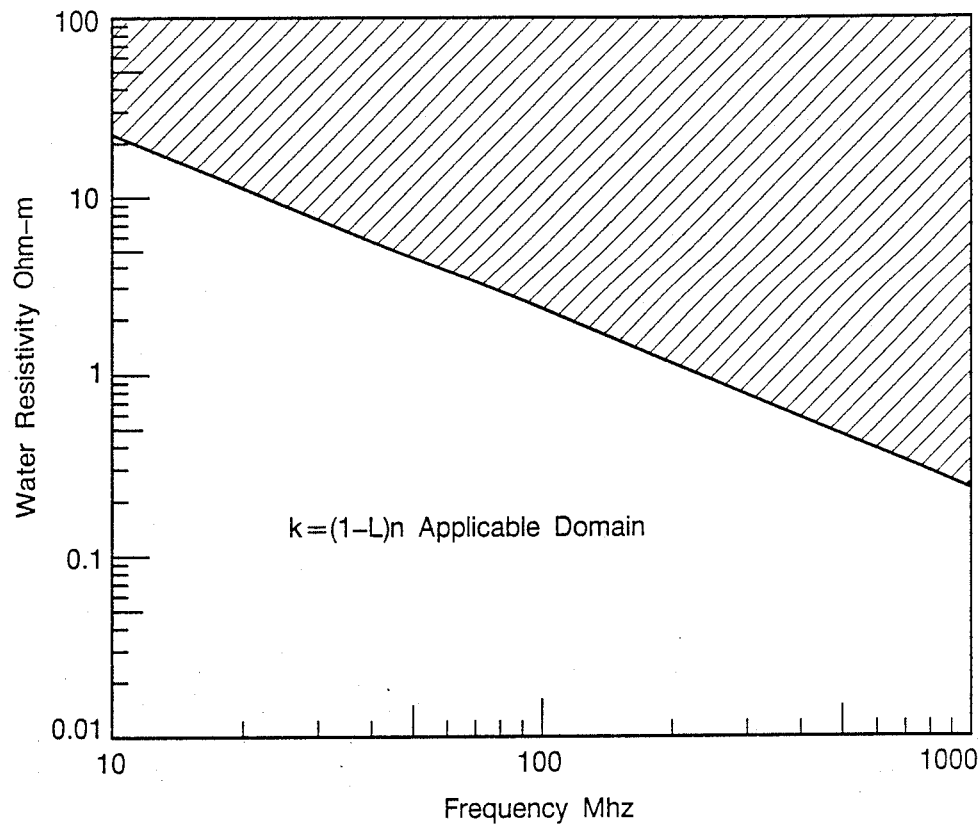

So long as the frequency of the dielectric tool used in obtaining the dielectric permittivity data and the water conductivity of the subsurface earth earth formation are in a signal frequency - water conductivity domain, where water conductivity is the dominant response of the dielectric permittivity of the porous earth formation, Archie's water saturation exponent n and the depolarization factor L can be used to provide a good estimate of the new parameter k. Such a domain is shown in FIG. 2 discussed below in more detail.

In the practice of the invention, resistivity logging, when appropriate, can be conducted using any of the standard resistivity logging tools known to those skilled in the art. Similarly, dielectric permittivity logging, when appropriate, can be practiced using any of the dielectric logging tools known to those skilled in the art. In some cases, as will be apparent, it will be desirable to chose the frequency of the dielectric logging tool so that the data thereby obtained falls into the logging frequency-water conductivity domain where water conductivity is the dominant response of the dielectric permittivity data. Similarly, Archie's saturation exponent n and the Hanai Bruggeman depolarization factor L can be determined for the porous earth formation by methods known to those skilled in the art. All of these techniques are well known to those skilled in the art and need not be further described in connection with this application.

In the practice of the invention, specifically, the depolarization factor L can be determined from brinesaturated samples of a formation by first measuring the porosity of the sample by a standard technique such as helium porosimetry, then measuring the dry sample to determine the rock matrix dielectric permittivity, and then saturating the sample with a brine of known or measured dielectric permittivity and measuring the dielectric permittivity using standard techniques. The depolarization factor L can then be calculated using the brine-saturated permittivity measurements from the Hanai-Bruggeman equation.

In the practice of the invention, functional parameters k and k' can be determined as herein described.

As used herein, water conductivity is considered the dominant response of the dielectric permittivity data when water conductivity is such that $\epsilon''_w > \epsilon'_w$; preferably, where the water conductivity is such that $\epsilon''_w > 1.5\ \epsilon'_w$. Further, it can be readily determined whether conductivity is the dominant response of the dielectric permittivity of the saturating brine by a direct evaluation as described above of water samples obtained from the formation or by previous knowledge of the formation water salinity in the area of the well. For dielectric permittivity measurements taken in a zone next to the borehole, the fluid in the formation will be similar to that of the drilling fluid and its conductivity characteristics can be determined by those skilled in the art from a knowledge of the characteristics of the drilling fluid.

EXAMPLE I

Dielectric permittivities were measured on samples from the Berea, Nugget, Weber, Strawn and San Andres formations. The measurements were made by the s-parameter technique at frequencies between 96 MHz and 1.1 GHz using a Hewlett-Packard 8505 Network Analyzer (Rau and Wharton, "Measurement of Core Electrical Parameters at UHF and Microwave Frequencies," SPE Paper 9380, 1980). The samples were machined to fit a General Radio GR900 coaxial air line. All measurements taken on partially saturated samples were corrected for the presence of the gap between the sample and the sample holder electrodes (Huang and Shen, "Analysis of Error Due to Presence of Gaps in the Measurement of Rock Samples in a Coaxial Line," Geophysics, v. 48, p. 206–212, 1983). The fully brine saturated samples were not corrected for a gap since sufficient water was present on the samples to fill the gap and minimize the error caused by the gap.

The dielectric permittivity matrix values of the samples were determined from the dry sample measurements by extrapolating the measurements on dry samples to zero porosity.

The depolarization factors L for the various formations were determined from brine saturated samples of the formation. Each sample first had its porosity measured by a standard technique such as helium porosimetry. The sample was then saturated with brine and the dielectric permittivity was measured using standard techniques (Rau and Wharton, 1980). The depolarization factor L was then calculated using the brine saturated permittivity measurements and the Hanai-Bruggeman Equation. Depolarization factors measured for each sample were then averaged for a formation. The averaged depolarization factor for a formation was used in the Hanai-Bruggeman Equation to calculate $\phi_c$ from dielectric logs and as described herein for determining the formation dielectric saturation exponent k.

The dielectric permittivity-water saturation exponent is determined for a sample by first removing part of the water from a fully water saturated sample, followed by determining the amount of water removed by weighing the sample when dry, when fully saturated, and when partially saturated. Partially saturated samples are prepared by centrifuging fully saturated samples. Following centrifuging, the samples are wrapped in water impervious material and allowed to equilibrate for 24 hours before measuring. The level of water saturation is determined by weighing the samples following the electrical measurements. Then the actual or measured water saturation of each sample can be calculated. The dielectric permittivity of the partially saturated sample can then be measured and $\phi_c$ calculated, for example, from the Hanai-Bruggeman Equation. The porosity ratio $\phi_c/\phi_T$ can be obtained by dividing $\phi_c$ determined from, for example, the Hanai-Bruggeman Equation by the total porosity $\phi_T$ as measured by the helium porosimeter. The exponent k can then be determined by a least-squares regression on log ($S_w$) and log ($\phi_c/\phi_T$).

FIG. 1 shows dielectric permittivity-water saturation exponent k determined for six Berea sandstone samples and further shows the parameter k obtained by fitting the resulting porosity ratio $\phi_c/\phi_T$ to water saturation $S_w$.

Measurements of the dielectric permittivity-water saturation exponent k were likewise made for Nugget sandstone, Weber sandstone, San Andres dolomite, and Strawn limestone. The results are set forth in Table Ia.

TABLE Ia

Comparison of Calculated Water Saturation Using
k = 1 (Eq. 3) to True Saturation of 50%. Freq. = 1.1 GHz

| Formation | True Water Saturation % | Measured k | Calculated Water Saturation k = 1 | Deviation from $S_w$ = 50% in Saturation Units |
|---|---|---|---|---|
| Berea | 50 | 1.30 | 41% | −9 |
| Nugget | 50 | 0.66 | 63 | +13 |
| Strawn | 50 | 0.78 | 58 | +8 |
| San Andres | 50 | 1.15 | 45 | −5 |
| Weber | 50 | 0.98 | 51 | +1 |

For the Berea sandstone, k=1.30 which represents a significant deviation from the value predicted by Eq. (2) above. Likewise, the Nugget sandstone has a value of the dielectric permittivity-water saturation exponent of k=0.66. For the San Andres dolomite and the Strawn limestone, the measured value of k is 1.15 for the San Andres and 0.78 for the Strawn. All of these values represent significant deviations from the porosity determined from dielectric permittivity alone.

For the Weber sandstone, k was determined to be about 0.98. The measured value of 0.98 for k indicates that Eq. (2) would be a good interpretation model in the Weber sandstone if a model of interpretation of dielectric permittivity data such as the Hanai Bruggeman Equation, Eq. (3), was used to determine $\phi_c$. Hence, the determination of the functional parameter k in accordance with the invention indicates the reliability of the water-filled porosity as determined from such models as the Hanai-Bruggeman equation for the porous rock formation.

EXAMPLE II

This Example indicates that when water conductivity dominates the dielectric permittivity, that is, when water conductivity is such that $\epsilon''_w > 1.5\epsilon'_w$, then the magnitude of the dielectric saturation exponent, k, can be estimated from the depolarization factor, L, and Archie's saturation exponent, n, using Eq. (7). Conventional low frequency (1000 Hz) saturation exponents were measured on the Berea, Nugget and Strawn samples. Newman ("Logging Measurement of Residual Oil, Rangely Field, Colorado," SPE Paper 8844 1980) reported a saturation exponent of 1.45 for the Weber. The results of saturation exponent measurements on these four formations and the estimated dielectric saturation exponents are summarized in Table IIa.

TABLE IIa

Comparison of Water Saturation Calculated Using
k = (1 − L)n to Laboratory Measured k for $S_w$ = 50%.

| Formation | Measured L | Measured n | Estimated k = (1 − L)n | Measured k | Deviation of Water Saturations from Est. k Compared to $S_w$ = 50% |
|---|---|---|---|---|---|
| Berea* | .402 | 2.01 | 1.20 | 1.30 | −2 |
| Berea*** | .421 | 2.01 | 1.16 | 1.13 | +1 |
| Nugget* | .400 | 1.13 | 0.68 | 0.66 | +1 |
| Nugget**** | .451 | 1.13 | 0.62 | 0.56 | +3 |
| Strawn* | .386 | 1.23 | 0.76 | 0.78 | −1 |
| Weber* | .371 | 1.45** | 0.91 | 0.98 | −3 |

*Freq. = 1.1 GHz
**Reported by Newman (1980)
***Freq. = 129 MHz
****Freq. = 96 MHz The four formations show close agreement between measured k values and estimated k values. The last column of Table IIa shows the difference between a value of 50% water saturation as determined with the measured k value and the calculated water saturation determined using the estimated value of k. The greatest deviation for the estimated k value water saturation occurs for the Weber sandstone which differs by three saturation units from the measured value of 50%. Even this is excellent agreement considering that the saturation exponent for the Weber was determined on samples from a different well than was the dielectric saturation exponent.

In regard to dielectric permittivity logging at a frequency in the water resistivity-signal frequency domain where water conductivity is the dominant response of the dielectric permittivity data, the porosity index $\phi_c/\phi_T$ was also compared to measured water saturation for a Berea sandstone, the dielectric permittivity data having been measured at a signal frequency of 1.1 GHz. k was measured and fit as described in Example I and found to be 1.30 which is a significant departure from the exponent k=1 predicted by Eq. (2) prior to the invention. The dielectric permittivity water saturation exponent k was also estimated from resistivity data in accordance with the invention and found to be about 1.22. Hence, the parameter k estimated from resistivity data is more accurate than the value assumed by Eq. (2).

The same Berea sandstone samples had the dielectric permittivity data measured at 129 MHz which is in a frequency range that satisfies the criteria of $\epsilon''_w > 1.5\epsilon'_w$. In this case, the measured k was determined be 1.13' which is in close agreement with an estimated k of 1.16.

Hence, where water conductivity is the dominant response of the dielectric permittivity data, resistivity data such as the Archie saturation exponent n and the depolarization factor L, can be used to obtain a reliable estimate of rock porosity. In other formations where water conductivity is the dominant response in the dielectric permittivity measured at both 1.1 GHz and 96 MHz, there was found to be good correlation between porosity index and the water saturation, and k=(1−L)n was indicated to be a good estimate of the measured k. In one case, the measured k was 0.56 at 96 MHz, while the estimated k was 0.61; in another instance, the measured k was 0.66 at 1.1 GHz while the estimated k is 0.68.

Based on these, and other results, FIG. 2 illustrates a water resistivity-signal frequency domain for which k=(1−L)n is a good estimate of measured k.

Thus, this Example II indicates (a) that the dielectric water saturation Equation (4) above $$S_w = [\phi_c/\phi_T]^{1/k}$$

is valid at all salinities and measurement signal frequencies; and (b) that the methods of estimating the exponent k using $k=(1-L)n$ provides accurate results for the water conductivity-signal frequency domain in which water conductivity is the dominant response in the dielectric permittivity.

From the foregoing it will be appreciated that there has been provided a new improved method for evaluating hydrocarbon and water saturation in porous earth formations from dielectric permittivity measurements. The new method uses a parameter representative of the influence on dielectric permittivity of the porous earth formation of the geometrical distribution of the rock matrix as well as the variable geometrical distribution of hydrocarbon and water in the porous earth formation as water saturation changes. The parameter and/or the adjusted value of porosity can then be used in determining exploitation of a petroleum reservoir characterized by the porous earth formation, for validating measurements made without such adjustment, and for determining a value of water saturation and/or oil saturation of the porous earth formation. Thus, there has been provided a method for functionally relating a measure of porosity determined from dielectric permittivity data of the porous earth formation to the measured water-filled porosity of the porous reservoir rock. Further, there has been provided a method for determining such a value using dielectric permittivity data and available resistivity data where the dominant response of the dielectric permittivity data is water conductivity.

Other uses and applications of the methods in accordance with the invention will be apparent to those skilled in the art. Accordingly, the invention is not limited by the specific uses to which such methods are placed in this application, but by the claims appended hereto.

What is claimed is:

1. A method for determining the water saturation of a porous hydrocarbon and water-bearing earth formation, said process comprising the steps of:

obtaining a first formation parameter, $\phi_c$, which is based upon dielectric permittivity data and represents a measure of water-filled porosity of said formation and which takes into account the geometrical distribution of rock and water in said earth formation;

obtaining a second formation parameter, $\phi_t$, which is based upon the total porosity of the rock containing both water and hydrocarbon in said formation; and determining a value for water saturation, $S_w$, of said earth formation having improved accuracy and reliability by functionally relating said first formation parameter to said second formation parameter by a functional third formation parameter, k, according to the equation $S_w = [\phi_c/\phi_t]1/k$.

2. The method of claim 1 comprising determining the functional parameter by determining water-filled porosity using dielectric permittivity data for a series of two or more samples of the porous earth formation having different water saturation values, measuring water-filled porosity for each sample in the series, and determining a functional parameter for functionally relating the resulting series of measurements of dielectric permittivity based water-filled porosity to the resulting series of measured water-filled porosity.

3. The method of claim 1 comprising determining the functional parameter by determining a value representative of water saturation using dielectric permittivity data for a series of two or more samples of the porous earth formation having different water saturation values, measuring water saturation for each sample of the series, and determining a functional parameter for functionally relating the resulting series of values representative of water saturation using dielectric permittivity data to the resulting series of measured water saturation values.

4. The method of claim 1 comprising determining a value of water saturation based on dielectric permittivity data representative of the porous earth formation and determining the functional parameter by combining the Archie Saturation Exponent n of the Archie Saturation Equation with the depolarization factor L of the Hanai-Bruggeman equation, each of the Archie saturation exponent and the depolarization factor being representative of the porous earth formation.

5. The method of claim 1 wherein the functional parameter is representative of the influence on dielectric permittivity of the porous earth formation of the geometrical distribution of matrix materials and the geometrical distribution of hydrocarbon and water across a range of two or more water saturation values of the porous earth formations.

6. The method of claim 4 comprising:

determining for a porous earth formation whether conductivity is the dominant response of dielectric permittivity of the porous earth formation at a frequency of dielectric permittivity logging, and, where conductivity is the dominant response at the frequency of dielectric permittivity volume, estimating the functional parameter as set forth in claim 4.

7. The method of claim 1 further comprising determining oil saturation of the porous earth formation using the new value of water saturation determined as in claim 1.

* * * * *

UNITED STATES PATENT AND TRADEMARK OFFICE
CERTIFICATE OF CORRECTION

PATENT NO. : 4,786,873

DATED : November 22, 1988

INVENTOR(S) : Sherman, Michael M.

It is certified that error appears in the above—identified patent and that said Letters Patent is hereby corrected as shown below:

In column 9, line 12 "$\varepsilon_w$" should read --$\varepsilon^*_w$--.

In column 14, line 48 "determined be 1.13'" should read --determined to be 1.13 --.

In column 15, line 1 "$S_w = ]\phi_c/\phi_T]^{1/k}$" should read --$S_w = [\phi_c/\phi_T]^{1/k}$--.

Signed and Sealed this

Eighteenth Day of July, 1989

Attest:

DONALD J. QUIGG

*Attesting Officer*  *Commissioner of Patents and Trademarks*